(12) United States Patent
Chefalas et al.

(10) Patent No.: US 10,326,844 B2
(45) Date of Patent: Jun. 18, 2019

(54) CLOUD ENABLING RESOURCES AS A SERVICE

(71) Applicant: International Business Machines Corporation, Armonk, NY (US)

(72) Inventors: Thomas E. Chefalas, Somers, NY (US); Chang-Shing Perng, Sunnyvale, CA (US); Anca Sailer, Scarsdale, NY (US); Ignacio Silva-Lepe, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 15/130,946

(22) Filed: Apr. 16, 2016

(65) Prior Publication Data

US 2017/0302744 A1 Oct. 19, 2017

(51) Int. Cl.
*G06F 15/173* (2006.01)
*H04L 29/08* (2006.01)
*H04L 12/911* (2013.01)

(52) U.S. Cl.
CPC ............ *H04L 67/16* (2013.01); *H04L 47/822* (2013.01)

(58) Field of Classification Search
None
See application file for complete search history.

(56) References Cited

U.S. PATENT DOCUMENTS

| | | | |
|---|---|---|---|
| 8,904,159 B2 | 12/2014 | Bealkowski | |
| 9,063,791 B2 | 6/2015 | Dorai et al. | |
| 9,083,653 B2 | 7/2015 | Walls et al. | |
| 2012/0324116 A1* | 12/2012 | Dorai | G06F 9/5072 709/226 |
| 2015/0205602 A1* | 7/2015 | Prismon | G06F 8/71 717/121 |
| 2015/0254248 A1* | 9/2015 | Burns | G06F 16/24578 707/749 |
| 2016/0195856 A1* | 7/2016 | Spero | G06N 5/046 700/90 |

OTHER PUBLICATIONS

Peter Mell et al. The NIST Definition of Cloud Computing. NIST Special Publication 800-145. Sep. 2011. pp. 1-7.

* cited by examiner

*Primary Examiner* — Phyllis A Book
(74) *Attorney, Agent, or Firm* — David Zwick; Otterstedt, Ellenbogen & Kammer, LLP (57) ABSTRACT

One aspect includes a method for constructing a specified virtual solution, comprising: obtaining a solution profile from a solution repository catalog, wherein the solution profile identifies one or more resources for the specified virtual solution; acquiring the one or more resources identified by the solution profile from one or more devices; and assembling the acquired one or more resources in accordance with the solution profile to construct the specified virtual solution. Another aspect includes a method for providing a Resource-as-a-Service (RaaS) functionality in a cloud architecture, comprising: implementing a software defined infrastructure comprising distributed workload placement, location management, and data management; and implementing a RaaS layer comprising resource discovery and registration of capabilities.

15 Claims, 6 Drawing Sheets

CLOUD ENABLING RESOURCES AS A SERVICE

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to service technologies and application-specific/industry-specific solutions.

BACKGROUND OF THE INVENTION

Present approaches to interfacing resources (e.g., printers) to a cloud include iCloud® available from Apple, Inc., and Google® Cloud Print available from Google, Inc. However, these solutions are limited both by being manual and being vendor-specific (i.e., dedicated to the cloud of a particular vendor).

Current technological trends include cloud computing, Internet of Things (IoT), mobile computing, and AppStore-type services, more broadly known as product markets. The inventors believe that these trends are heading towards a convergence point. Mobile computing and the Internet of Things (IoT) already have some synergy, to the extent that mobile devices are IoT-enabled and make some use of cloud computing. However, neither mobile devices nor IoT devices are equivalent to cloud computing resources. As cloud computing evolves towards an AppStore-type of marketplace, so should mobile and IoT devices.

SUMMARY OF THE INVENTION

One aspect includes a method for constructing a specified virtual solution, comprising: obtaining a solution profile from a solution repository catalog, wherein the solution profile identifies one or more resources for the specified virtual solution; acquiring the one or more resources identified by the solution profile from one or more devices; and assembling the acquired one or more resources in accordance with the solution profile to construct the specified virtual solution. Another aspect includes a method for providing a Resource-as-a-Service (RaaS) functionality in a cloud architecture, comprising: implementing a software defined infrastructure comprising distributed workload placement, location management, and data management; and implementing a RaaS layer comprising resource discovery and registration of capabilities.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
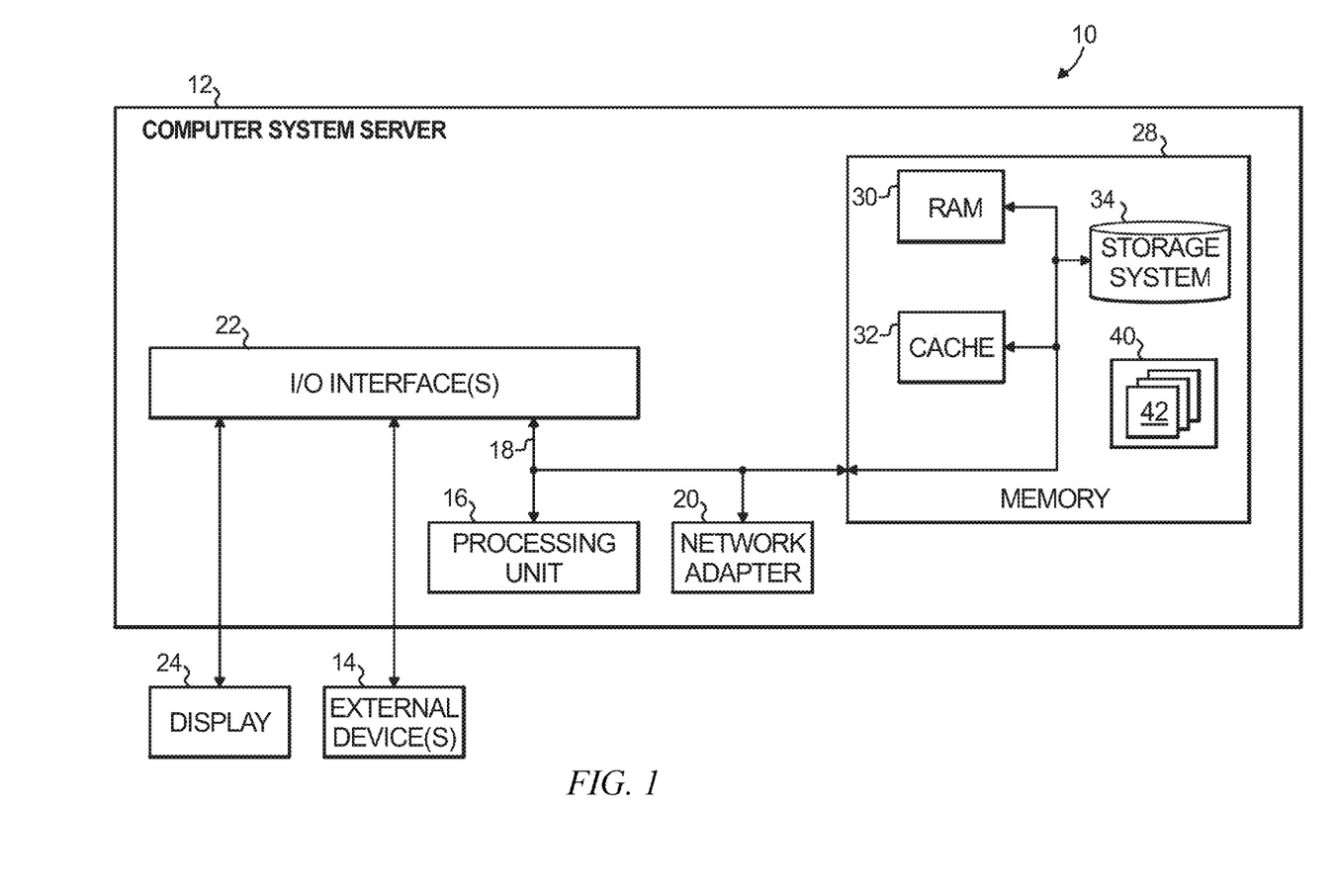
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
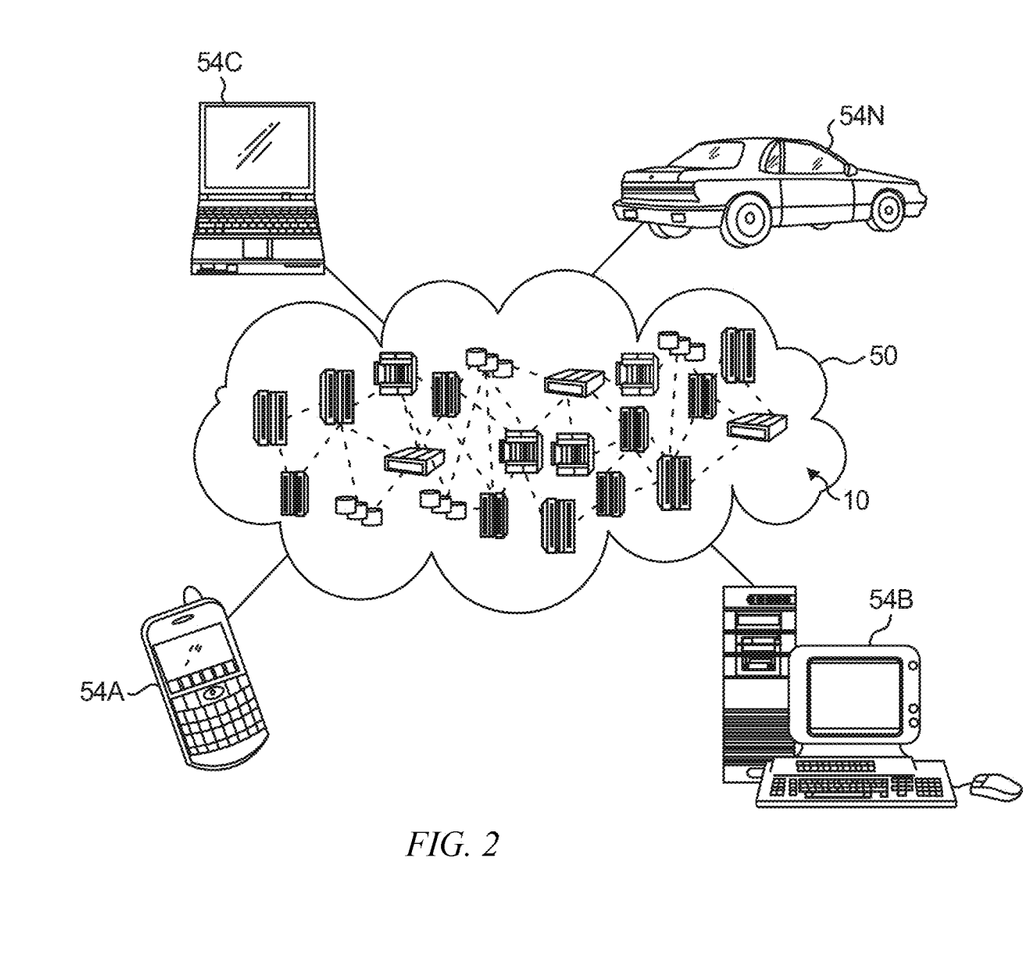
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
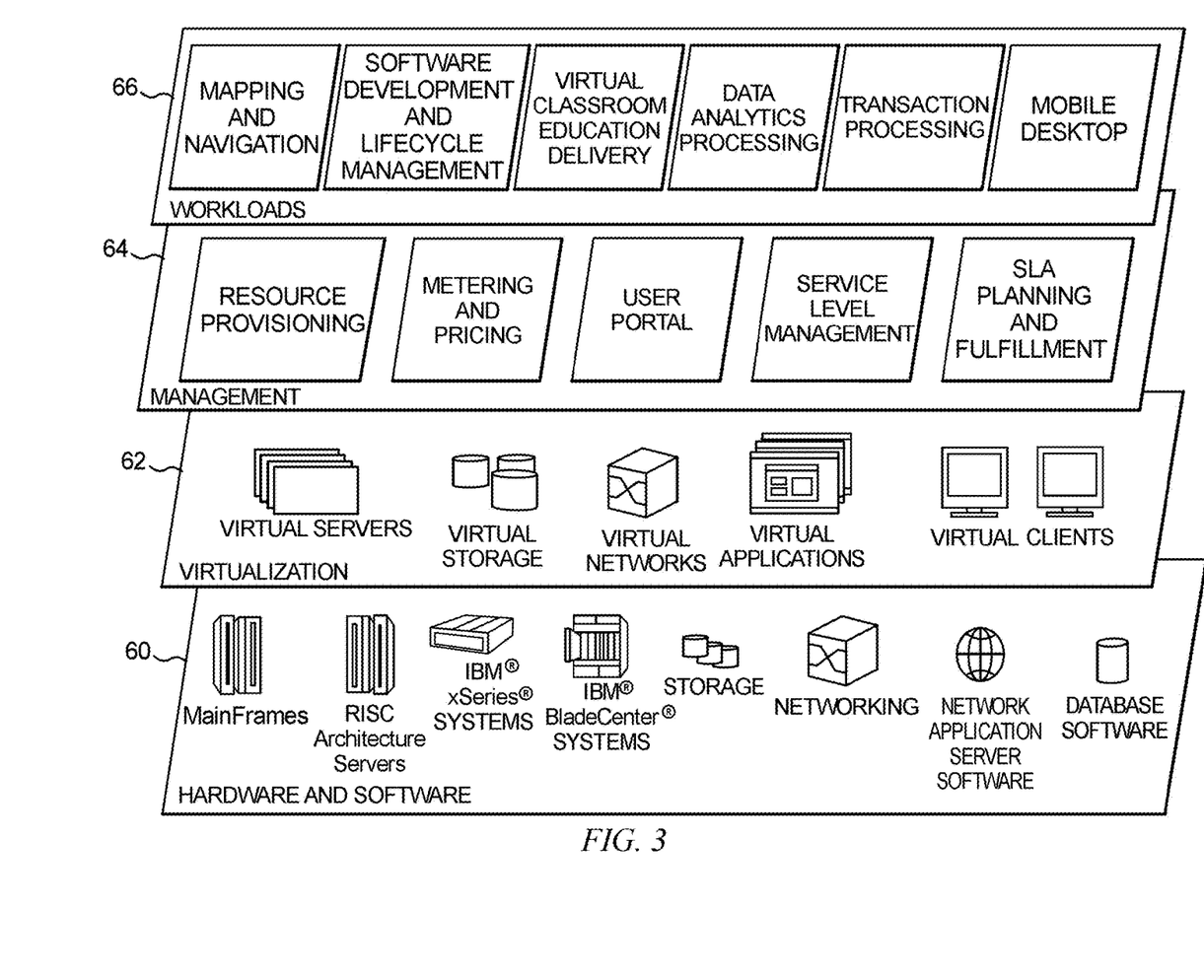
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The aforementioned IaaS, PaaS, and SaaS service models represent increasing levels of cloud abstraction. IaaS abstracts computing infrastructure into the cloud, PaaS abstracts a programming environment into the cloud, and SaaS abstracts a software solution and/or application into the cloud. Embodiments of the present invention advantageously provide an even greater level of abstraction, in the form of Resource as a Service (RaaS). In an exemplary embodiment of RaaS, resources automatically identify themselves as members of any public (e.g., heterogeneous) cloud based on user-defined profiles.

Embodiments of the present invention additionally and/or alternatively provide a Smart Cloud of Smart Resources (SCSR), also known as a Smart Cloud of Smart Things (SCST), that is heterogeneous and ubiquitous, e.g., consisting of a plurality of resource types that are not tied to a single data center or cloud provider. One or embodiments of the present invention provide an SCSR and/or SCST with features including: smart discovery and placement of resources, composition of smart services on smart things, and policy-governed privacy and security. One or more embodiments of the present invention advantageously bridge the end user and enterprise, thus allowing for seamless set up of a cloud.

The aforementioned heterogeneity and ubiquity reduces requirements of physical services to permit ad hoc realization of a cloud from smart things. For example, a smart camera and 3D printer can be joined in an exemplary SCSR and/or SCST. This cloud formation differentiation permits an ever-evolving cloud with multi-dimensional elasticity comparable to modeling clay.

One or more embodiments of the present invention are directed to creating ad hoc clouds out of cloud-enabled resources, for example, using self-configuring and discovery capabilities. Thus, unlike conventional arrangements, embodiments of the present invention require neither a hypervisor nor virtual resources in an existing cloud. Additionally and/or alternatively, one or more embodiments of the present invention allow existing resources to be auto-selected based on their declared capabilities without requiring the user to coordinate their roles and without requiring software to be deployed on cloud compute resources.

Figure 4A:
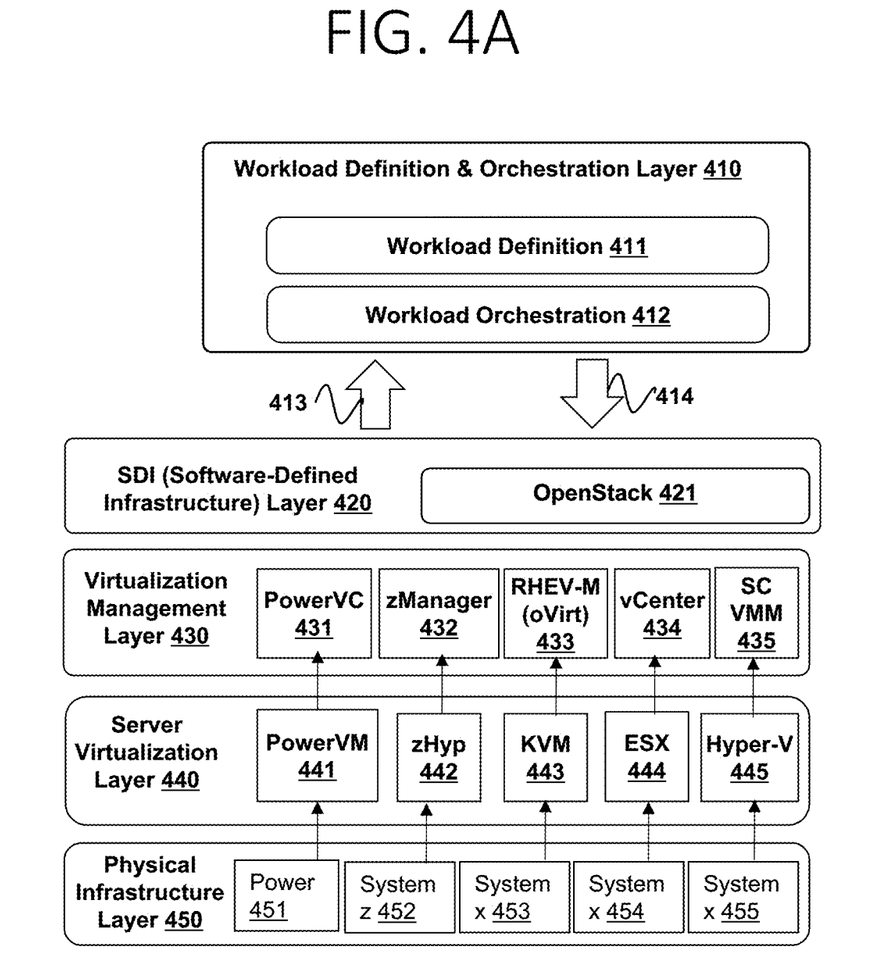
FIG. 4A depicts an exemplary cloud infrastructure utilizing existing approaches.

FIG. 4A depicts an exemplary cloud infrastructure utilizing existing approaches. The cloud infrastructure shown in FIG. 4A includes workplace definition and orchestration layer 410, which comprises workload definition component 411 and workload orchestration 412. The cloud infrastructure shown in FIG. 4A also includes software-defined infrastructure (SDI) layer 420 which may, for example, comprise one or more installations of OpenStack® 421. OpenStack® is a registered trademark of the OpenStack Foundation, which maintains this open-source software.

Layers 410 and 420 communicate via services 413 and 414 which may comprise, for example, web services. Communication from layer 420 to layer 410 may include, for example, compute resource inventory, monitoring and/or reporting. Communication from layer 410 to layer 420 may include, for example, compute patterns, workload contexts, and/or service level objectives.

The remaining layers of the cloud infrastructure shown in FIG. 4A are virtualization management layer 430, server virtualization layer 440, and physical infrastructure 450. Server virtualization layer 440 includes components commonly known as hypervisors. Each of these layers has five components, which correspond to one another. For example, component 431 in layer 430 corresponds to, and communicates with, component 441 in layer 440, which corresponds to, and communicates with component 451 in layer 450. Each of the components within layer 430 communicates with layer 420 and, in this embodiment, more particularly with component 421. The components within physical infrastructure layer 450 in FIG. 4A represent components typically associated with data centers, such as compute, storage, and/or network components.

Power Systems™ 451 within physical infrastructure layer 450 corresponds to and communicates with PowerVM® 441 within server virtualization layer 441, which corresponds to and communicates with Power Virtualization Center (PowerVC™) 431 within virtualization management layer 430. Power Systems, PowerVM, and PowerVC are each trademarks of, and available from, International Business Machines Corporation.

IBM® zSeries® system 452 within physical infrastructure layer 450 corresponds to and communicates with zHyp 442 within server virtualization layer 440, which corresponds to and communicates with IBM® z Unified Resource Manager (zManager) 432 within virtualization management layer 430. As will be appreciated by the skilled artisan, zHyp is a hypervisor for IBM® zSeries® systems. As previously noted, IBM and zSeries are both registered trademarks of International Business Machines Corporation.

Physical infrastructure layer 450 includes three IBM® xSeries® systems: 453, 454 and 455. IBM® xSeries® system 453 within physical infrastructure layer 450 corresponds to and communicates with Kernel-based Virtual Machine (KVM) 443 within server virtualization layer 440, which corresponds to and communicates with Red Hat® Enterprise Virtualization Management (RHEV-M) and/or oVirt® 433 within virtualization management layer 430. As previously noted, IBM® and xSeries® are both registered trademarks of International Business Machines Corporation. Red Hat® and oVirt® are both registered trademarks of Red Hat, Inc.

IBM® xSeries® system 454 within physical infrastructure layer 450 corresponds to and communicates with Elastic Sky X (ESX) 443 within server virtualization layer 440, which corresponds to and communicates with vCenter 433 within virtualization management layer 430. ESX and vCenter are both available from VMware, Inc.

IBM® xSeries® system 455 within physical infrastructure layer 450 corresponds to and communicates with Hyper-V 445 within server virtualization layer 440, which corresponds to and communicates with System Center Virtual Machine Manager (SCVMM) 435 within virtualization management layer 430. Hyper-V and SCVMM are both available from Microsoft Corporation.

Figure 4B:
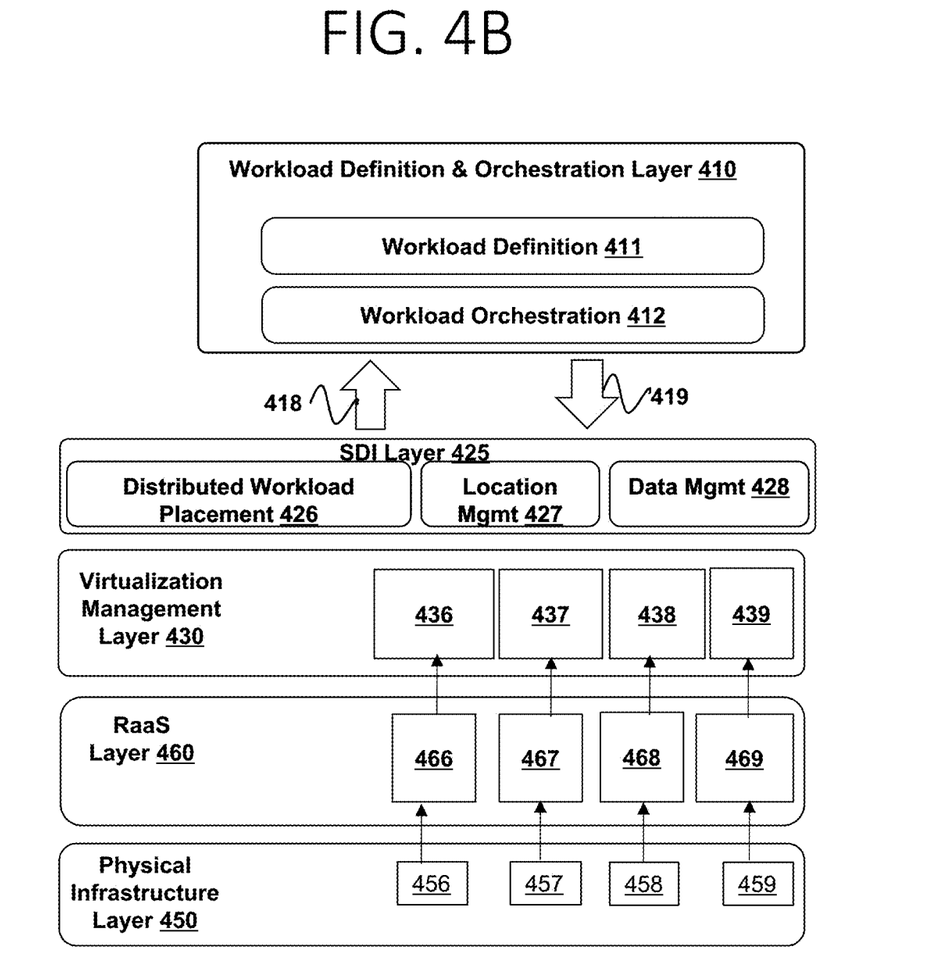
FIG. 4B depicts an exemplary cloud infrastructure utilizing principles of the present invention to implement distributed RaaS.

FIG. 4B depicts an exemplary cloud infrastructure utilizing principles of the present invention to implement distributed RaaS. Layer 410 is similar to that described with reference to FIG. 4A. However, the RaaS architecture enables a greater variety of services. For example, services 418 may include web conference, gaming, and/or analytics, while services 419 may include media playback and/or video surveillance.

SDI layer 425 in FIG. 4B provides enhanced functionality relative to the corresponding component 420 in FIG. 4A. SDI layer 425 includes a component 426 which provides distributed workplace placement and/or optimization. SDI layer 425 also includes a component providing location management 427 which may be used for placement and/or data governance. SDI layer 425 further includes a component providing data management 428 which may be used for replication and/or security.

Virtualization management layer 430 in FIG. 4B is similar to that shown in FIG. 4A. One or more of components 436-439 in FIG. 4B may be similar to one or more of components 431-435 in FIG. 4A. Each of components 436-439 in virtualization management layer 430 in FIG. 4B communicates with SDI layer 425.

Instead of the server visualization (e.g. hypervisor) layer 440 shown in FIG. 4A, the infrastructure shown in FIG. 4B includes a RaaS layer 460. RaaS layer 460 may correspond to one or more embodiments disclosed herein. RaaS layer 460 advantageously provides resource discovery and registration of capabilities. Each component within RaaS layer 460 communicates with a corresponding component in virtual management layer 440 and a corresponding component in physical infrastructure layer 450.

One or more of the components 456-459 within the physical infrastructure layer 450 in FIG. 4B may comprise one or more servers similar to components 451-455 in FIG. 4A. However, the components 456-459 are preferably smart resources, e.g., peripheral devices or devices associated with end users and/or consumers rather than data centers. Examples of such resources include a digital video recorder (DVR), camera (e.g., video and/or security camera), television, printer, 3D printer, kiosk, telephone (e.g., mobile phone), projector, sensor and/or tag reader.

An illustrative embodiment of the present invention includes a system and/or method for ad hoc creation from metamorphic cloud-enabled resources which is preferably capable of mixing and matching metamorphic resources of any of a plurality of types. The system comprising metamorphic resources, including at least one controller, and a resource requirement profile. The metamorphic resource is comprised of an identifier, a capability profile, and/or a location. The controller is a special type of resource with both self-configuration and discovery capabilities. The resource requirement profile models a need for a specific resource. In one or more embodiments, the controller composes virtual resources from registered devices according to a user-selected profile and morphs them into a virtual solution.

Figure 5:
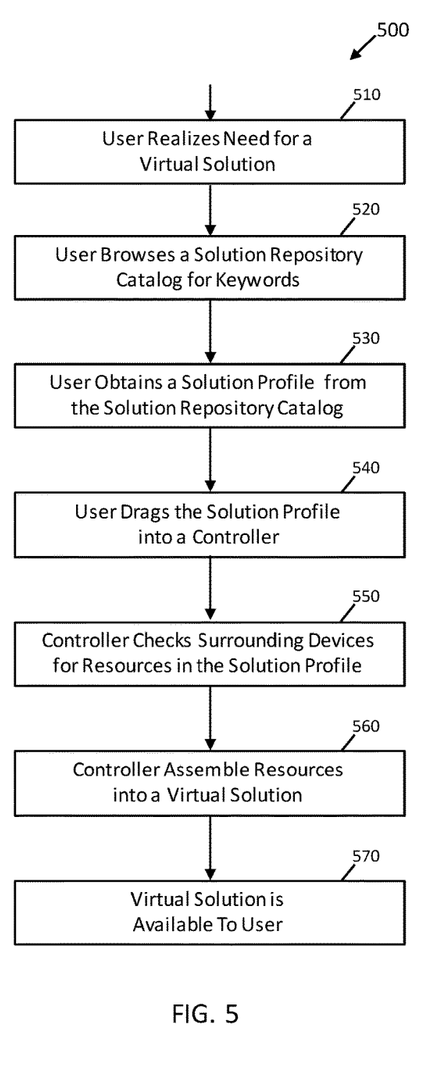
FIG. 5 shows an exemplary workflow for a user according to an illustrative embodiment of the present invention.

FIG. 5 shows an exemplary workflow 500 for an end user, which may be an individual and/or an enterprise, according to an illustrative embodiment of the present invention. Workflow 500 begins with step 510, in which the user realizes a need for a virtual solution, such as a virtual projector. In step 520, the user browses a solution repository catalog for key words. The solution repository catalog is further described with reference to FIG. 7 below.

In step 530, the user obtains, and preferably selects, a solution profile from the solution repository catalog. In some embodiments, the solution profile may be essentially the same as the resource requirement profile, with the content aligned to have a match between a resource requirement and a potential solution. The solution profile may, for example, describe all resources needed to assemble a projector mapped to potential devices. The obtained and/or selected solution profile preferably identifies all needed virtual resources as being available in the surrounding proximity.

In step 540, the user drags the solution profile into a controller, which may be an app running on a smart phone and/or tablet. In step 550, the controller checks the surrounding devices for the resources in the solution profile. In step 560, the controller assembles these resources into a virtual solution. In step 570, the virtual solution is available to the user.

Figure 6:
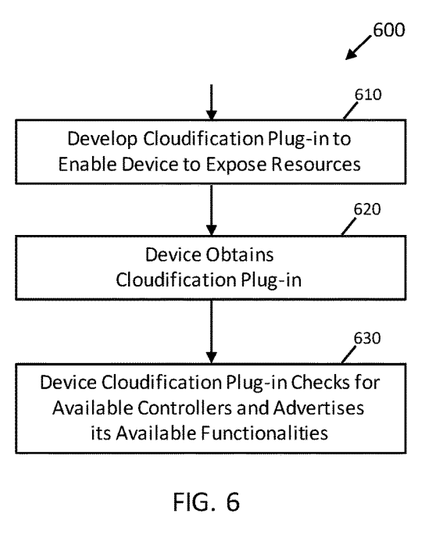
FIG. 6 shows an exemplary workflow for a provider of cloud products and/or devices according to an illustrative embodiment of the present invention.

FIG. 6 shows an exemplary workflow 600 for a provider of cloud products and/or devices, according to an illustrative embodiment of the present invention. Workflow 600 begins with step 610, in which the provider develops a cloudification plug-in to enable a device to expose its resources as third-party accessible functionality. These plug-ins may utilize, for example, an application program interface (API), a universal serial bus (USB) drive and/or a network such as BlueTooth®, which is a registered trademark of BlueTooth SIG, Inc. Preferably, a standard cloudification terminology is provided and used, such as a cloud service ontology.

In step 620, the device obtains the cloudification plug-in, for example, by connecting to the Internet to obtain a software and/or firmware update incorporating the cloudification plug-in. In step 630, the device cloudification plug-in checks for available controllers in the surrounding proximity and advertises its available functionalities as virtual resources.

Figure 7:
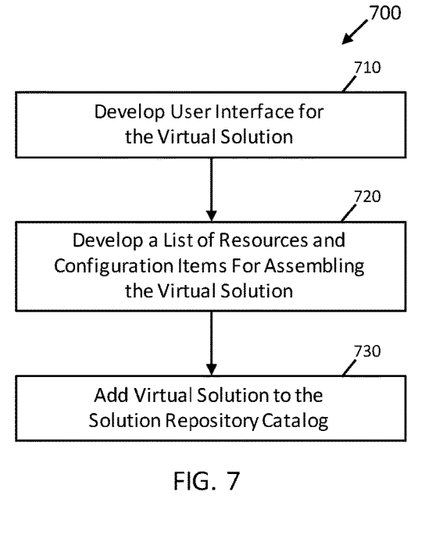
FIG. 7 shows an exemplary workflow for an application developer and/or a creator of a solution profile according to an illustrative embodiment of the present invention.

FIG. 7 shows an exemplary workflow 700 for an application developer and/or a creator of a solution profile, according to an illustrative embodiment of the present invention. Workflow 700 begins with step 710, in which creators of a solution profile develop a user interface (UI) for the user to use the virtual solution. Preferably a standard cloudification terminology is provided and used, such as a cloud service ontology. In step 720, the creator of a solution profile develops a list of resources and configuration items needed to assemble the virtual solution. In step 730, the creator adds the virtual solution to the solution repository catalog.

One or more illustrative embodiments include management of security profiles based on SCSR-defined cloud contexts. In these embodiments, complex profiles of trust may dictate the authentication and/or authorization rules for creation of and/or access to the ad hoc SMST cloud.

Security profiles may be managed for the resource type and/or location context. A home profile may be highly secure, a local profile may be moderately secure, and a public profile may be open.

Additionally and/or alternatively, security profiles may be managed for the cloud initiator contexts. An administrator profile may be highly secure, a home owner profile may be moderately secure, and a guest profile may be open.

Additionally and/or alternatively, security profiles may be managed for the application or service contexts. A billing service profile may be highly secure, a printing service profile may be moderately secure, and a water administration service profile may be open.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments are particularly significant in the context of a cloud or virtual machine environment, although this is exemplary and non-limiting. Reference is made back to FIGS. 1-3 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks in the figures. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface to implement user interface aspects of the on-line IT analytics managed system for class-based management 400 is reporting provided through the portal and report generator 412, to a computing device of a user. Such a user interface can be implemented, for example, via hypertext markup language (HTML) code served out by a server or the like, to a browser of a computing device of a user. The HTML is parsed by the browser on the user's computing device to create a graphical user interface (GUI). Any number of techniques for generating web pages may be used.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for constructing a specified virtual solution, comprising:
   obtaining a solution profile from a solution repository catalog, wherein the solution profile identifies one or more resources for the specified virtual solution;
   acquiring the one or more resources identified by the solution profile from one or more devices, each device having a device cloudification plug-in and advertising its available functionalities as virtual resources, at least one of the one or more devices being a peripheral device; and
   assembling the acquired one or more resources in accordance with the solution profile to construct the specified virtual solution, the acquiring and assembling being performed by a resource entity having self-configuration and discovery capabilities.

2. The method of claim 1, wherein at least one of the one or more resources comprises a metamorphic resource.

3. The method of claim 1, wherein at least one of the one or more resources comprises an identifier, a capability profile, and a location.

4. The method of claim 1, wherein at least one of the one or more resources comprises a controller with self-configuration and discovery capabilities.

5. The method of claim 4, wherein at least the assembling step is performed by the controller.

6. The method of claim 1, wherein obtaining the solution profile comprises:
   a user selecting the solution profile from the solution repository catalog.

7. The method of claim 1, wherein obtaining the solution profile comprises:
   a user determining a need for the specified virtual solution.

8. The method of claim 1, wherein obtaining the solution profile comprises:
   a user browsing the solution repository catalog for one or more key words.

9. The method of claim 1, wherein obtaining the solution profile comprises:

selecting the solution profile at least in part because each of the one or more resources identified by the solution profile is available from at least one of the one or more devices.

10. The method of claim 1, wherein the one or more resources are heterogeneous and of differing types.

11. The method of claim 1, wherein the one or more resources are not tied to a single data center or cloud provider.

12. An apparatus comprising:
   a memory; and
   at least one processor, coupled to said memory, and operative to:
      obtain a solution profile from a solution repository catalog, wherein the solution profile identifies one or more resources for a specified virtual solution;
      acquire the one or more resources identified by the solution profile from one or more devices, each device having a device cloudification plug-in and advertising its available functionalities as virtual resources, at least one of the one or more devices being a peripheral device; and
      assemble the acquired one or more resources in accordance with the solution profile to construct the specified virtual solution, the acquiring and assembling being performed by a resource entity having self-configuration and discovery capabilities.

13. The apparatus of claim 12, wherein the at least one processor is further operative to select the solution profile at least in part because each of the one or more resources identified by the solution profile is available from at least one of the one or more devices.

14. A non-transitory computer readable medium comprising computer executable instructions which when executed by a computer cause the computer to perform the method of:
   obtaining a solution profile from a solution repository catalog, wherein the solution profile identifies one or more resources for the specified virtual solution;
   acquiring the one or more resources identified by the solution profile from one or more devices, each device having a device cloudification plug-in and advertising its available functionalities as virtual resources, at least one of the one or more devices being a peripheral device; and
   assembling the acquired one or more resources in accordance with the solution profile to construct the specified virtual solution, the acquiring and assembling being performed by a resource entity having self-configuration and discovery capabilities.

15. The non-transitory computer readable medium of claim 14, wherein the obtaining comprises selecting the solution profile at least in part because each of the one or more resources identified by the solution profile is available from at least one of the one or more devices.

* * * * *